United States Patent
Wong et al.

(10) Patent No.: US 8,214,003 B2
(45) Date of Patent: Jul. 3, 2012

(54) RF RADIATION REDIRECTION AWAY FROM PORTABLE COMMUNICATION DEVICE USER

(75) Inventors: Alfred Y. Wong, Los Angeles, CA (US);
Robert Moreno, Acton, CA (US); Karl Richard Shields, North Hills, CA (US);
Rong Wang, Sherman Oaks, CA (US)

(73) Assignee: Pong Research Corporation, Leesburg, VA (US)

( * ) Notice: Subject to any disclaimer, the term of this patent is extended or adjusted under 35 U.S.C. 154(b) by 178 days.

(21) Appl. No.: 12/724,290

(22) Filed: Mar. 15, 2010

(65) Prior Publication Data

US 2010/0234081 A1 Sep. 16, 2010

Related U.S. Application Data

(63) Continuation-in-part of application No. 12/614,132, filed on Nov. 6, 2009.

(60) Provisional application No. 61/160,282, filed on Mar. 13, 2009.

(51) Int. Cl.
*H04W 88/02* (2009.01)

(52) U.S. Cl. ............... 455/575.5; 455/575.1; 455/575.7; 455/90.3

(58) Field of Classification Search .................. 455/575, 455/575.5, 575.1, 90.1, 41.2, 75, 558, 66.1, 455/550.1, 422, 450, 73, 77, 101, 289, 280, 455/90, 128, 90.3, 575.7, 575.8, 562.1, 63.1, 455/575.6; 343/702, 749, 841, 700, 846
See application file for complete search history.

(56) References Cited

U.S. PATENT DOCUMENTS

| | | | |
|---|---|---|---|
| 5,278,571 A * | 1/1994 | Helfrick | 343/703 |
| 5,338,896 A | 8/1994 | Danforth | |
| 5,550,552 A | 8/1996 | Oxley | |
| 5,711,014 A * | 1/1998 | Crowley et al. | 455/575.7 |
| 5,726,383 A | 3/1998 | Geller et al. | |
| 5,777,261 A | 7/1998 | Katz | |
| 5,787,340 A | 7/1998 | Sepponen | |
| 6,082,535 A | 7/2000 | Mitchell | |
| 6,249,256 B1 * | 6/2001 | Luxon et al. | 343/702 |
| 6,341,217 B1 | 1/2002 | Wong | |
| 6,359,213 B1 | 3/2002 | Long | |

(Continued)

FOREIGN PATENT DOCUMENTS

EP  1 292 042 A2  3/2003

(Continued)

OTHER PUBLICATIONS

Office Action for U.S. Appl. No. 12/614,132, mailed Oct. 20, 2011.

(Continued)

*Primary Examiner* — Tan Trinh

(57) ABSTRACT

A case for a wireless device includes a number of RF coupling elements mounted in the case and configured such that RF radiation is coupled from an internal antenna of the wireless device out of the device to a first RF coupling element, and from the first RF coupling element to a RF redirector coupling element that redirects the RF radiation in a direction outward from said wireless device that is opposite to a user side of the wireless device. A corrugated metallic shield is optionally provided on an opposite side of the case, facing a user of the device.

22 Claims, 11 Drawing Sheets

U.S. PATENT DOCUMENTS

| | | |
|---|---|---|
| 6,492,957 B2 | 12/2002 | Carillo, Jr. et al. |
| 6,515,223 B2 | 2/2003 | Tashjian |
| 6,568,576 B1 | 5/2003 | Godshaw et al. |
| 6,576,832 B2 | 6/2003 | Svarfvar et al. |
| 6,603,981 B1 | 8/2003 | Carillo, Jr. et al. |
| 6,615,026 B1 | 9/2003 | Wong |
| 6,711,387 B1 | 3/2004 | Lungley |
| 6,768,523 B2 | 7/2004 | Cheng et al. |
| 6,855,883 B1 | 2/2005 | Matsui |
| 6,856,819 B2 | 2/2005 | Itoh |
| 6,871,079 B1 | 3/2005 | Choi et al. |
| 6,880,737 B2 | 4/2005 | Bauer |
| 6,924,770 B2 | 8/2005 | Carpenter et al. |
| 6,947,000 B2 | 9/2005 | Ito |
| 6,950,674 B2 | 9/2005 | Jarrett |
| 6,980,777 B2 | 12/2005 | Shepherd et al. |
| 6,985,110 B2 | 1/2006 | Tanaka et al. |
| 7,031,762 B2 | 4/2006 | Shoji et al. |
| 7,065,379 B1 | 6/2006 | Kim et al. |
| 7,164,933 B1 | 1/2007 | Steigerwald et al. |
| 7,202,825 B2 | 4/2007 | Leizerovich et al. |
| 7,206,618 B2 | 4/2007 | Latto |
| 7,230,574 B2 * | 6/2007 | Johnson ................. 343/702 |
| 7,327,841 B2 | 2/2008 | Schreiber et al. |
| 7,812,770 B2 | 10/2010 | Qi et al. |
| 8,068,061 B2 | 11/2011 | Qi et al. |
| 2002/0009976 A1 | 1/2002 | Rashidi |
| 2002/0074142 A1 | 6/2002 | Katz |
| 2002/0183013 A1* | 12/2002 | Auckland et al. ............. 455/73 |
| 2002/0193136 A1 | 12/2002 | Halkosaari et al. |
| 2003/0078037 A1* | 4/2003 | Auckland et al. ........... 455/422 |
| 2004/0014506 A1 | 1/2004 | Kemppinen |
| 2005/0079820 A1* | 4/2005 | Yamashita ................. 455/41.2 |
| 2005/0104782 A1* | 5/2005 | Peled et al. ............... 343/702 |
| 2005/0195119 A1 | 9/2005 | Gaucher et al. |
| 2006/0019696 A1 | 1/2006 | Brunel et al. |
| 2006/0022889 A1 | 2/2006 | Chiang et al. |
| 2006/0232483 A1 | 10/2006 | Iwai et al. |
| 2006/0290575 A1 | 12/2006 | Pelzer |
| 2007/0004456 A1* | 1/2007 | Shimada ................. 455/558 |
| 2007/0241977 A1 | 10/2007 | Vance |
| 2008/0165064 A1 | 7/2008 | Hill et al. |
| 2009/0124215 A1* | 5/2009 | Nysen ................. 455/90.1 |
| 2009/0156151 A1* | 6/2009 | Anguera et al. ............. 455/289 |
| 2009/0318094 A1* | 12/2009 | Pros et al. ................. 455/75 |
| 2010/0113111 A1 | 5/2010 | Wong et al. |
| 2010/0214180 A1* | 8/2010 | Krogerus ................. 343/702 |
| 2010/0216520 A1 | 8/2010 | Lee |
| 2010/0291965 A1* | 11/2010 | Tabe ................. 455/550.1 |
| 2011/0036912 A1 | 2/2011 | Guo et al. |
| 2011/0140982 A1 | 6/2011 | Ozden et al. |

FOREIGN PATENT DOCUMENTS

| | | |
|---|---|---|
| EP | 1 942 580 A2 | 7/2008 |
| WO | WO 00/13330 | 3/2000 |
| WO | WO 01/35487 A1 | 5/2001 |
| WO | WO 02/95867 A1 | 11/2002 |
| WO | WO 03/028424 A1 | 4/2003 |

OTHER PUBLICATIONS

U.S. Appl. No. 13/287,680, filed Nov. 2, 2011.

International Search Report and Written Opinion for International Application No. PCT/US2009/063618, mailed Mar. 1, 2010.

Final Office Action for U.S. Appl. No. 12/614,132, mailed Mar. 1, 2012.

* cited by examiner

RF RADIATION REDIRECTION AWAY FROM PORTABLE COMMUNICATION DEVICE USER

CROSS-REFERENCE TO RELATED APPLICATIONS AND CLAIM FOR PRIORITY

This application claims benefit under 35 U.S.C. §119(e) of provisional application Ser. No. 61/160,282 filed Mar. 13, 2009; this application is also a continuation-in-part of copending application Ser. No. 12/614,132 filed Nov. 6, 2009; the entire contents of which are incorporated herein by reference in their entirety.

BACKGROUND OF THE INVENTION

1. Field of the Invention

This invention relates generally to portable communication devices such as cell phones, smart phones and similar handheld devices, and improvements thereto. In particular, this invention provides improvements in antennas and RF shielding of such devices, facing a direction away from the user, to redirecting RF radiation away from the body of a user.

2. Background

Design requirements of cellular phones and smart phones are placing an ever increasing premium on the available space within these devices as their functions become more diverse, ranging from the original basic function as a wireless telephone to a music player, video player, handheld computer, wireless internet device for browsing the web, retrieving email and downloading or uploading files, a still camera, a video camera, a GPS device, a navigation system, etc. These functions bring with them greatly increased demands upon the antenna and generally requires more radiation power for transmission, which must serve up to five frequency bands while occupying less space than ever before available for the antenna.

In addition, RF radiation from mobile phones is becoming of greater concern as a health risk, and addressing this issue in the design of the antenna while the space within the phone is reduced poses a particularly difficult challenge, as the only effective methods of significantly reducing RF radiation in the direction of the user, while allowing full power RF signal away from the user, require some additional space for the antenna.

The FCC requires limiting the radiation from a portable communication device (such as a mobile or cellular telephone) that is directed towards a user's head (Specific Absorption Rate, or SAR). Each year the FCC tends to lower the permitted level further. One of the reasons is safety. At the same time, as wireless communications technology advances, the mobile phone device has taken on the function of a hand-held computer with more data-intensive functions, requiring high rates of data transfer between the cell phone and the base station tower. It would be beneficial to the improved function of cell phones to be able to increase the power output of the antenna, but FCC regulations will not allow increased SAR.

The Smart Phone (e.g. iPhone, BlackBerry, etc.), for example, has an internal antenna(s) located at both the lower and upper parts of the phone, bordering the display area. The space for an antenna is usually limited to 1 cm times the width and thickness of the phone. The antenna is situated close to the back surface of the phone, on the side opposite to the user.

SUMMARY OF THE INVENTION

According to a first embodiment, a method of coupling radiation from the antenna inside a wireless phone to a location outside the device where the distribution of radiation can be better managed. It presents several methods of directing RF radiation away from the user's head by the appropriate placement of metallic loops, directors and other parasitic elements. This can take the form of arrays of monopole and dipole antennas, conducting loops and conducting plates with insulators or dielectrics. The general concept is to couple the radiation from the internal antenna on the side facing the user to the opposite side to direct such radiation outward away from the user.

DETAILED DESCRIPTION OF THE INVENTION

In one preferred embodiment of the invention, external coupling antennas are provided to couple radiation from the internal antenna of a wireless device and to redirect the radiation such that there is minimum radiation towards the user and maximum radiation away from the user. It is important to note that this coupling method does not require an actual physical connection between the external coupling antennas and the antenna internal to the phone. However the position of the coupling antenna with respect to the internal antenna is critical. Through a series of coupling loops, directing elements or patch antennas located on a cover or case, a "clip" structure, or directly on an external surface of the mobile device, the radiation is further directed away from the user's head (which is absorptive) to the environment for communication to cell towers.

The materials used for coupling and re-directional elements are generally made out of materials of high electrical conductivity. However dielectric materials are also used to achieve optimal physical sizes and spacing of various elements.

The above methodology is illustrated by the treatment of two exemplary wireless devices—the Apple 3G iPhone and the RIM Blackberry Curve 8300. However the procedure is perfectly general and can be applied to any wireless device using different combinations of the elements described.

Figure 1:
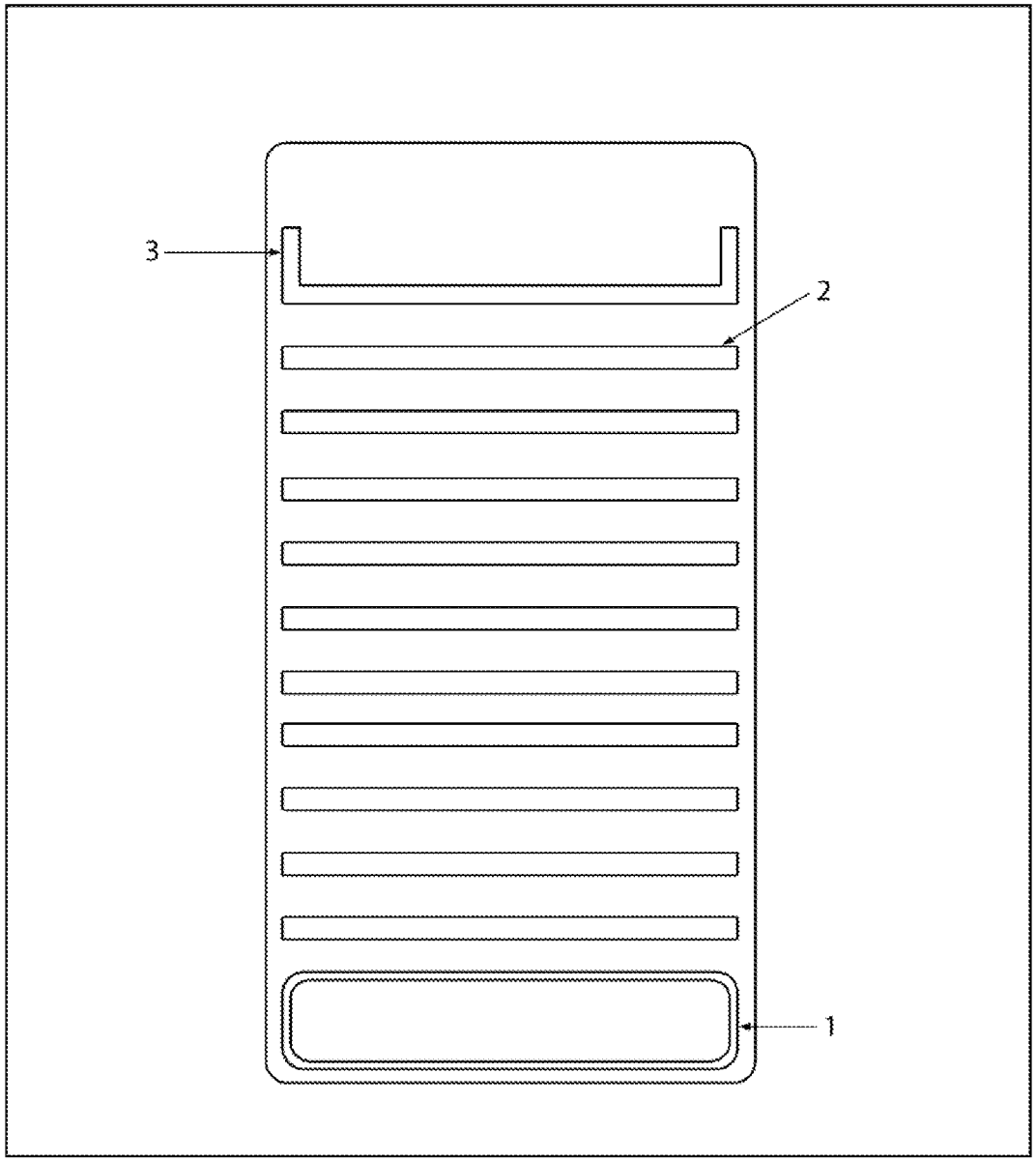
FIG. 1 shows RF coupling elements mounted on the back of a mobile telephone.
Figure 2:
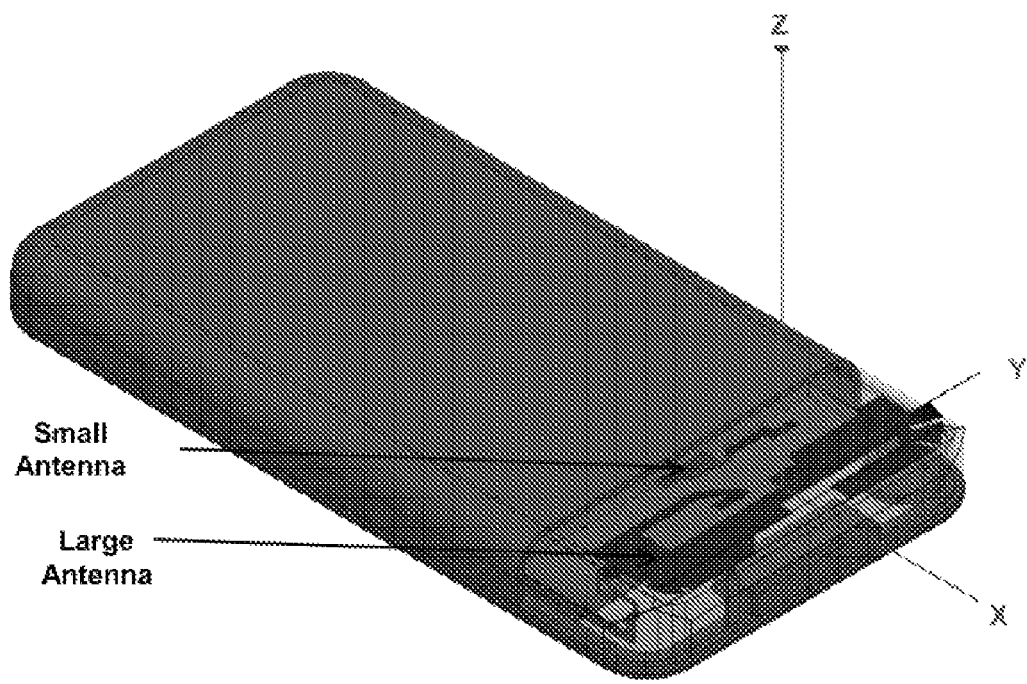
FIG. 2 shows a perspective view of a mobile telephone with placement of small and large antennas.

Referring to FIG. 1, the radiation from an internal antenna (not shown) is directed away from the user and outward at the back of the phone through a coupling loop 1 mounted on the back of the phone. The coupling is achieved through electromagnetic (EM) induction as revealed by laboratory experiments and computer modeling of various physical quantities (antennas, connectors, circuit elements, ground planes, etc.) inside a mobile communication device such as an Apple iPhone, as illustrated in FIG. 2. The EM fields are then successively coupled up a "ladder" of metallic strips 2 up the backside of the iPhone enclosed inside the case. The placement of the coupling loop 1 with respect to the antenna inside the mobile device is critical. As shown, the horizontal metallic strips may be straight, or may have regular or irregular shapes such as "U" shaped metallic element 3, whose dimensions are adjusted to fit the available space on the back of the phone, while achieving optimal coupling from the loop 1.

Figure 3:
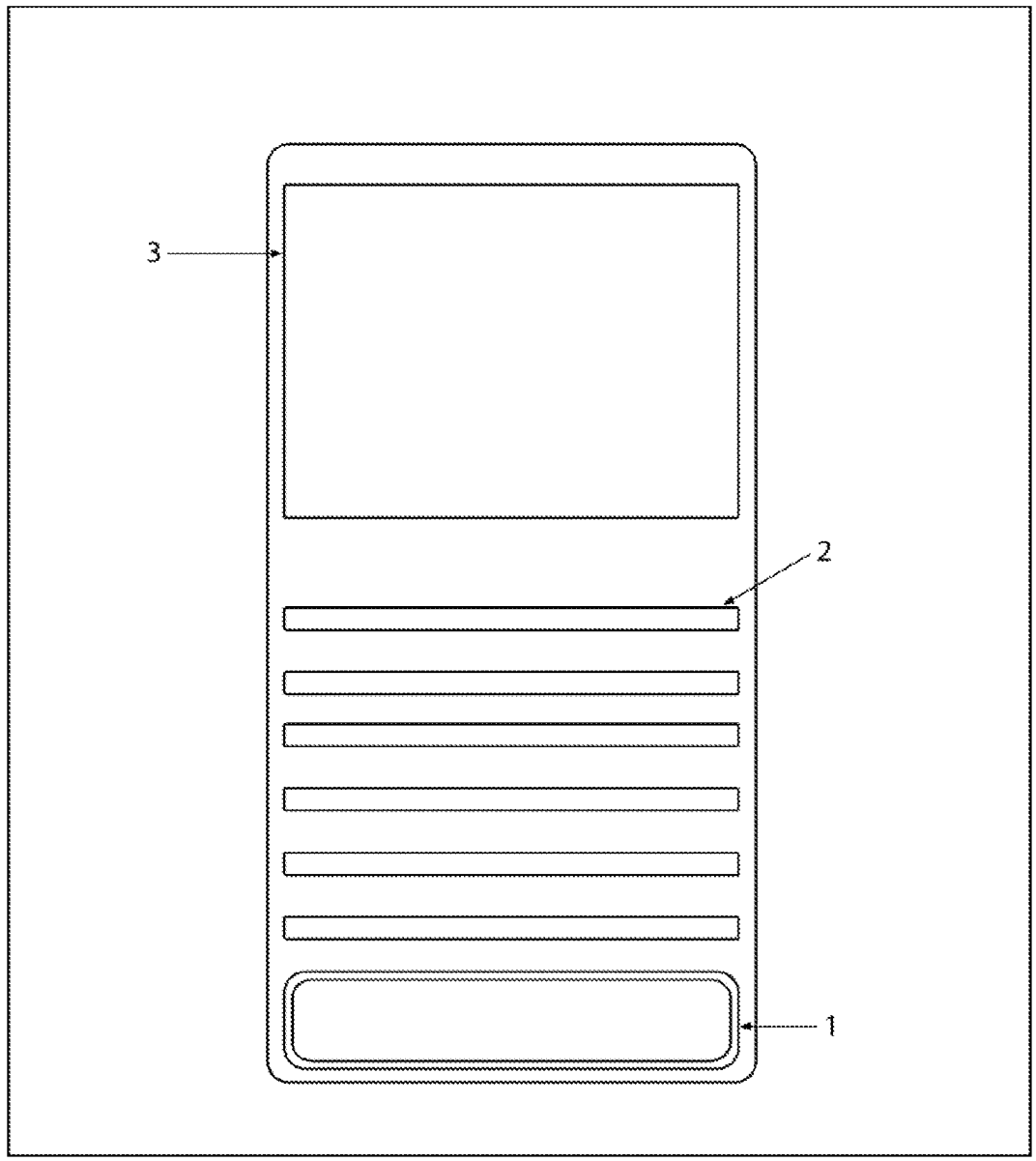
FIG. 3 shows an RF loop over an internal antenna of a mobile telephone.

One variation of the above design is in the replacement of an uppermost radiation re-director by a single plate 3 as illustrated in FIG. 3. The use of a plate resembles a patch antenna whose radiation pattern favors the outward direction away from the user. The loop 1 couples power out from the internal antenna, then the directors 2 couple the power up to the plate 3, from which the radiation is directed outward from the phone in the direction opposite to the user's head.

Figure 4:
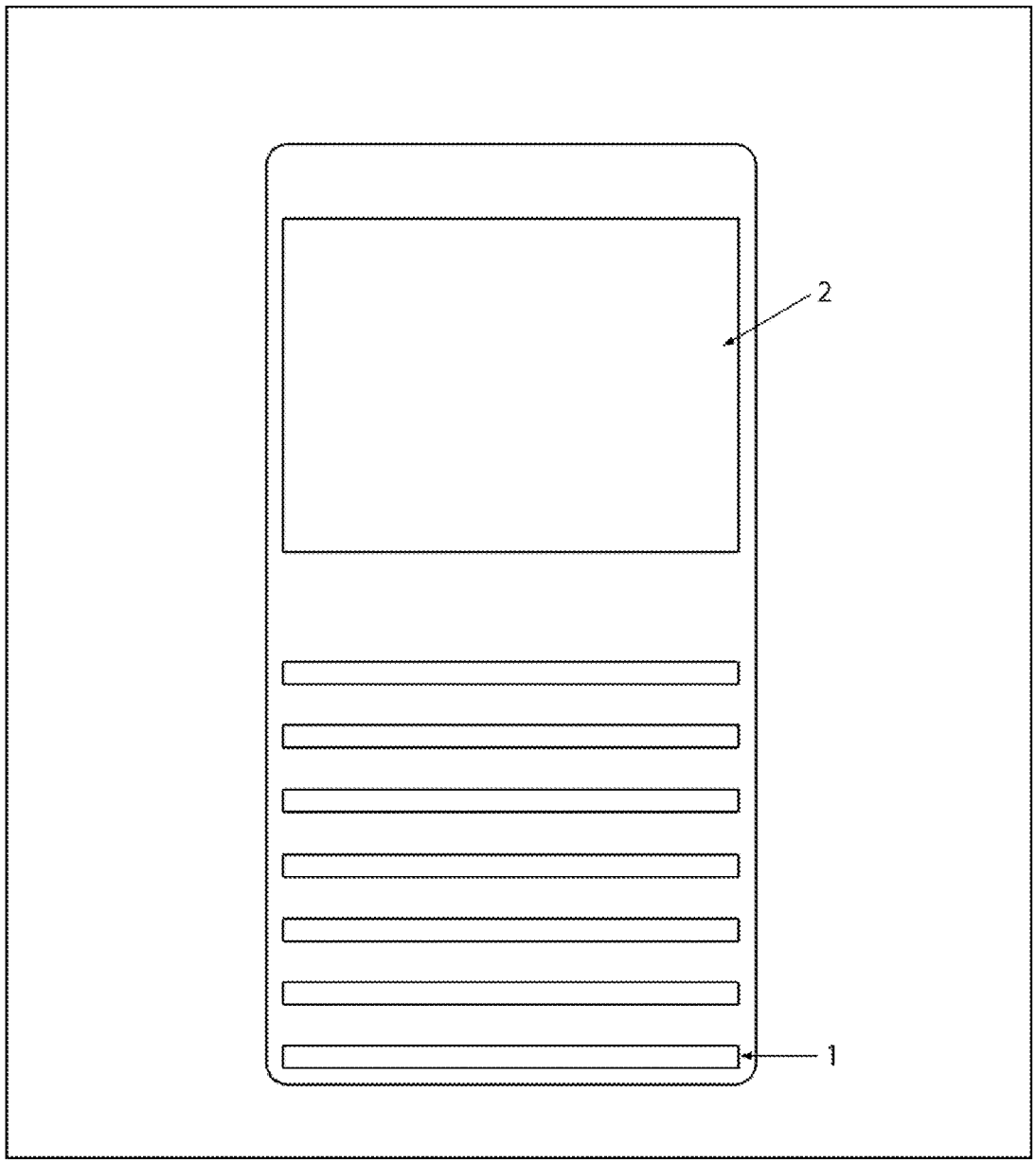
FIG. 4 shows an RF coupling parasitic device mounted on the back of a mobile telephone.
Figure 5:
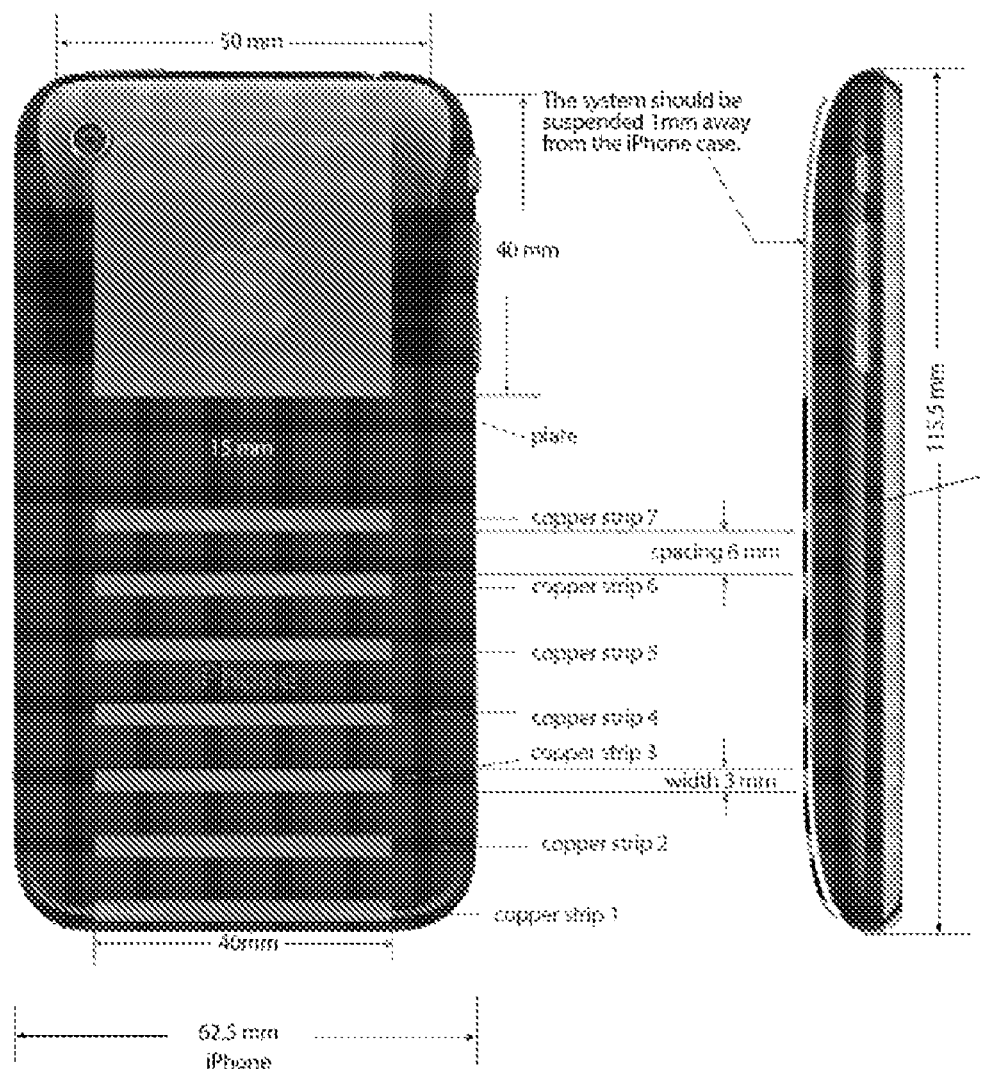
FIG. 5 shows a front and side view of a "ladder and plate" RF coupling design for a mobile telephone.

Another variation, illustrated in FIG. 4, as well as in FIG. 5, which depicts an application of this design to the Apple iPhone 3G, is the replacement of the coupling loop by an RF coupling parasitic redirector composed of horizontal strips 1 that form a ladder-like array leading to a rectangular plate 2 above the ladder. All these configurations have been tested and shown to significantly reduce the amount of radiation directed towards a user while maintaining or even enhancing the total radiation power of the cell phone.

Figure 6:
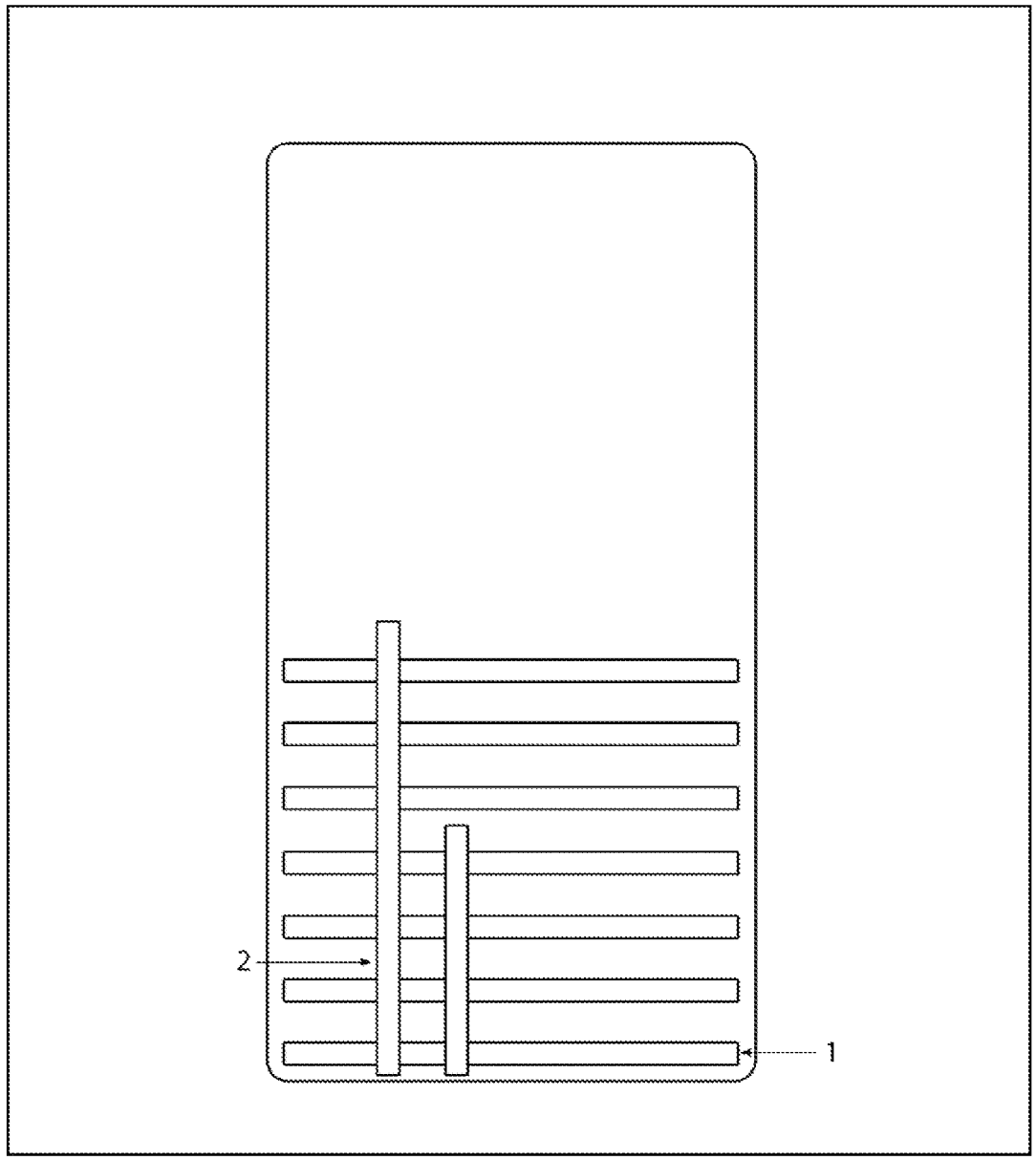
FIG. 6 shows an alternate embodiment of an RC coupling parasitic device mounted on the back of a mobile telephone.

A further embodiment is the use of vertical strips 2 that are orthogonal to the horizontal strips 1, as shown in FIG. 6. These vertical strips couple to a vertical polarization of the radiation from the internal cell phone antenna. The purpose is to couple to both polarizations to fully redirect the maximum amount of RF radiation from the cell phone antenna away from the direction of the user. The vertical strips 2 are placed in a layer above the horizontal strips such that they provide additional coupling with any corresponding vertical elements of the internal antenna.

Figure 7:
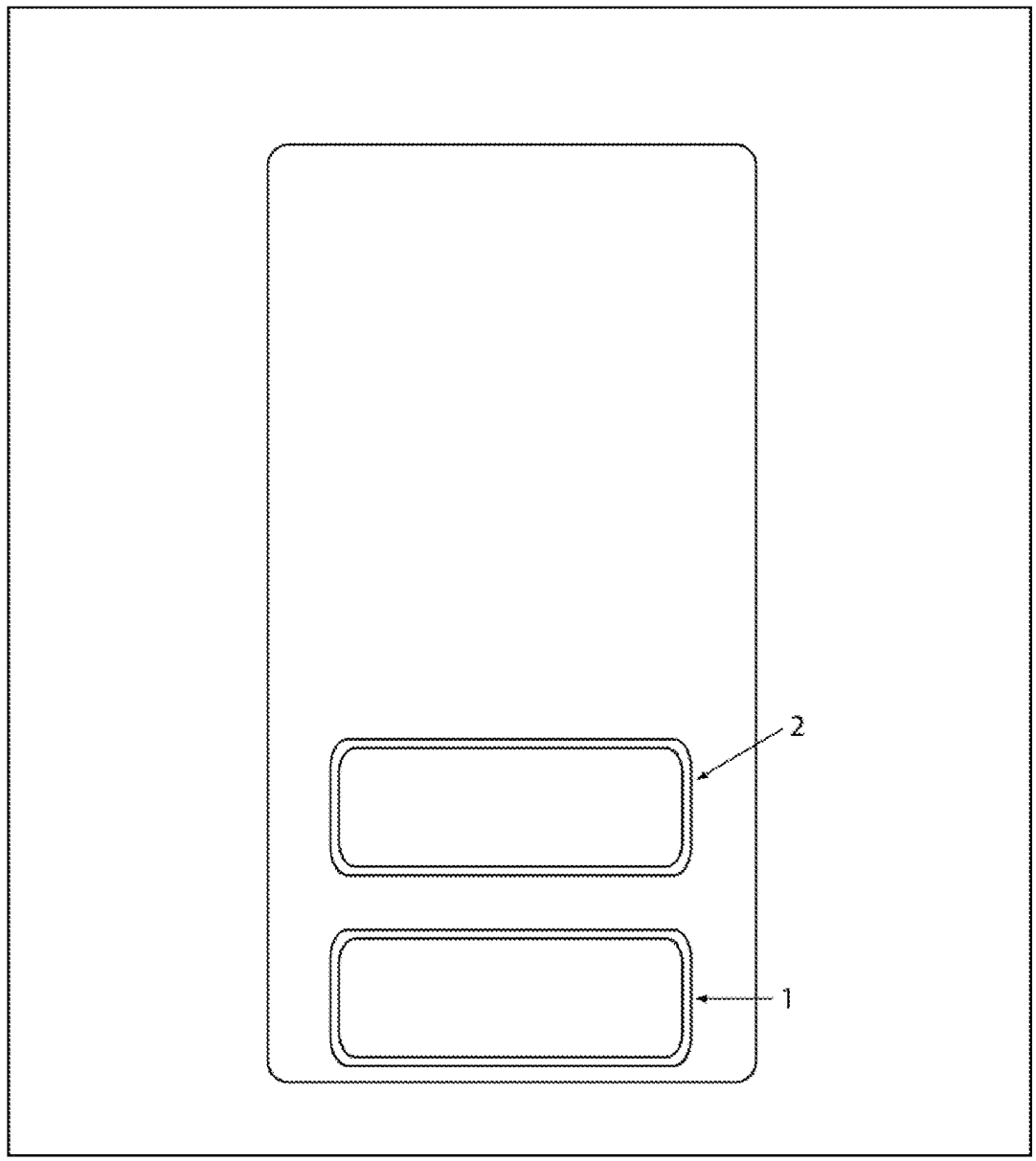
FIG. 7 shows a pair of RF coupling devices in the form of first and second loops mounted on the back of a mobile telephone.
Figure 8:
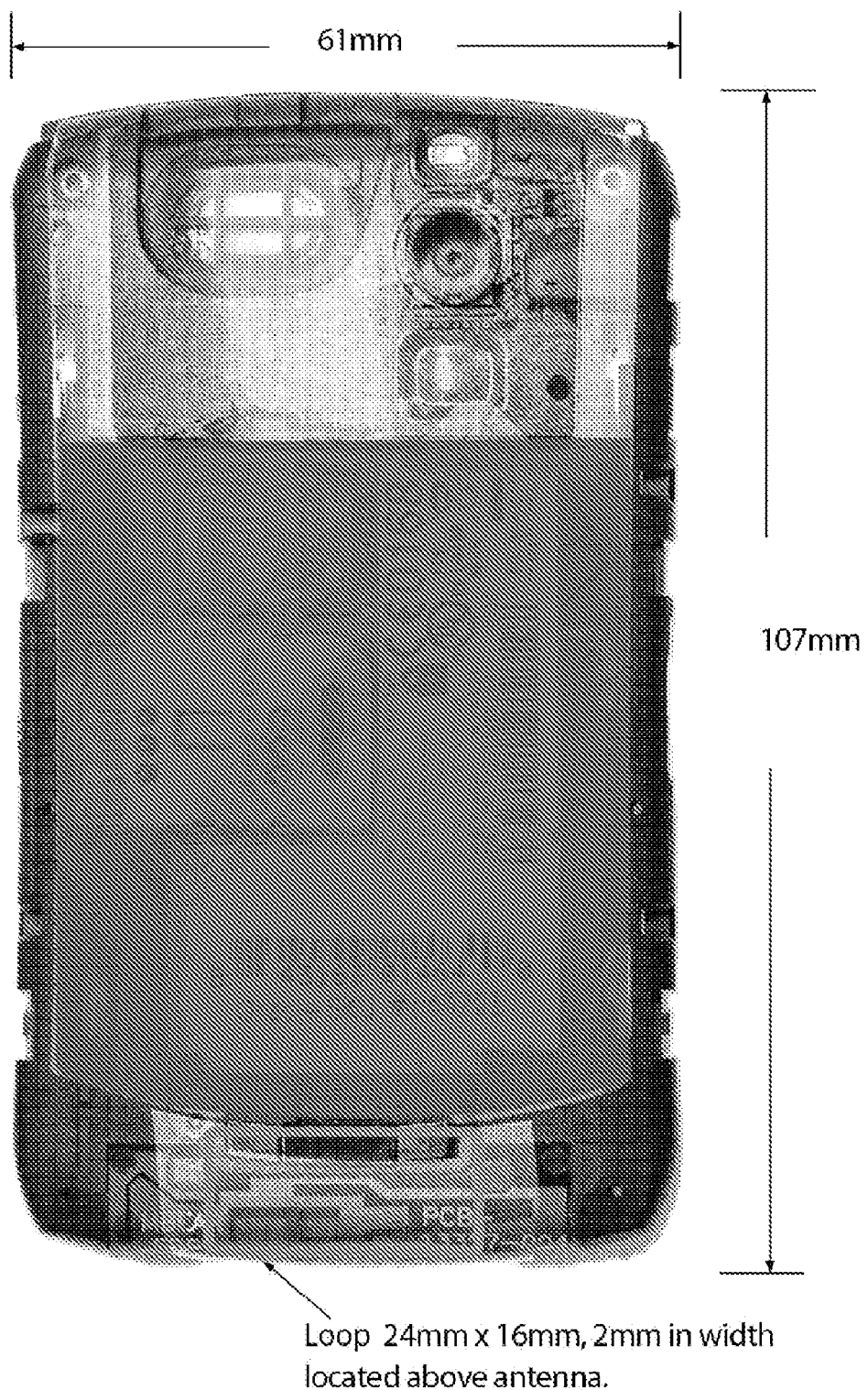
FIG. 8 shows a partial phantom view of an RF coupling loop design where the loop is mounted above the internal antenna of a mobile telephone.

For some wireless communication devices, such as the Blackberry 8300 shown in FIG. 8, the internal components of the phone require a simpler approach as illustrated in FIG. 7, where a single loop 1 is placed over the location of the internal antenna, and may be augmented by a second loop 2 above the first loop 1. The first loop 1 couples the RF field from the internal antenna, and the second loop 2 provides additional redirected radiation away from the user. Size and spacing are tuned to the particular phone. For the Blackberry 8300, a loop of 24 mm×16 mm×2 mm is placed such that it wraps under the bottom of the phone by 2 mm as shown in FIG. 8. This configuration produces ideal results as verified by independent laboratory testing by Cetecom in Milpitas, Calif.

Figure 9:
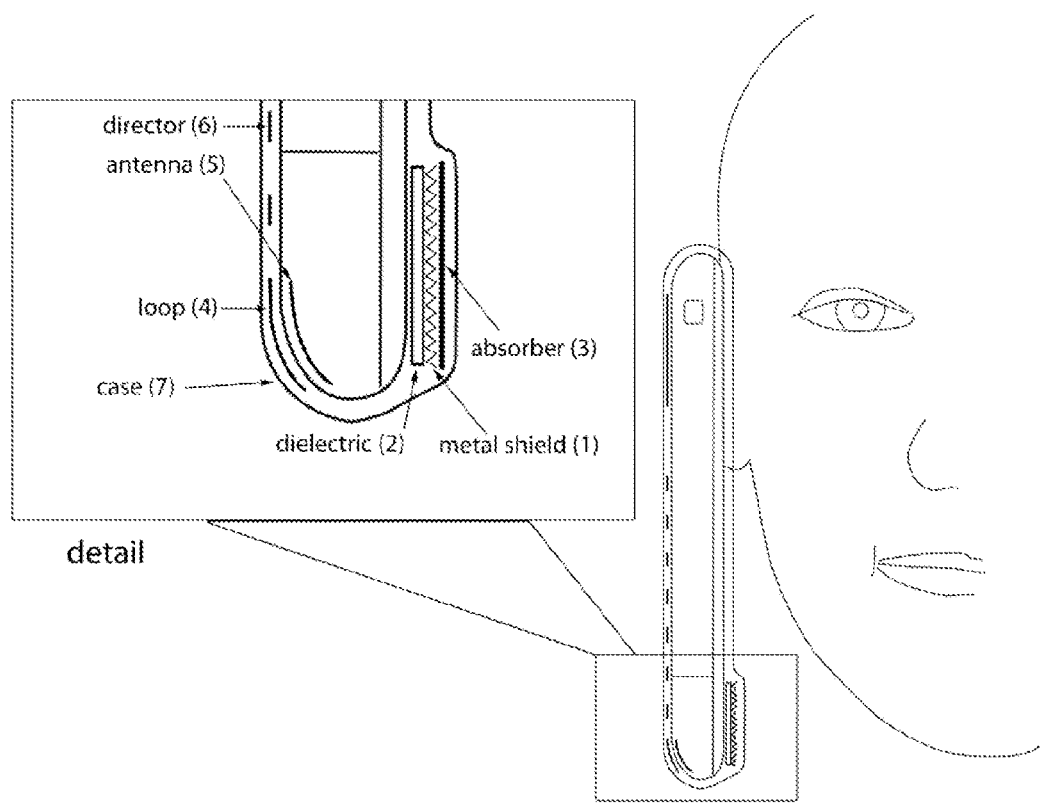
FIG. 9 shows a mobile telephone external case design including a reflective shield at the front side of the device and a radiation coupling device at the rear side of the device.
Figure 10:
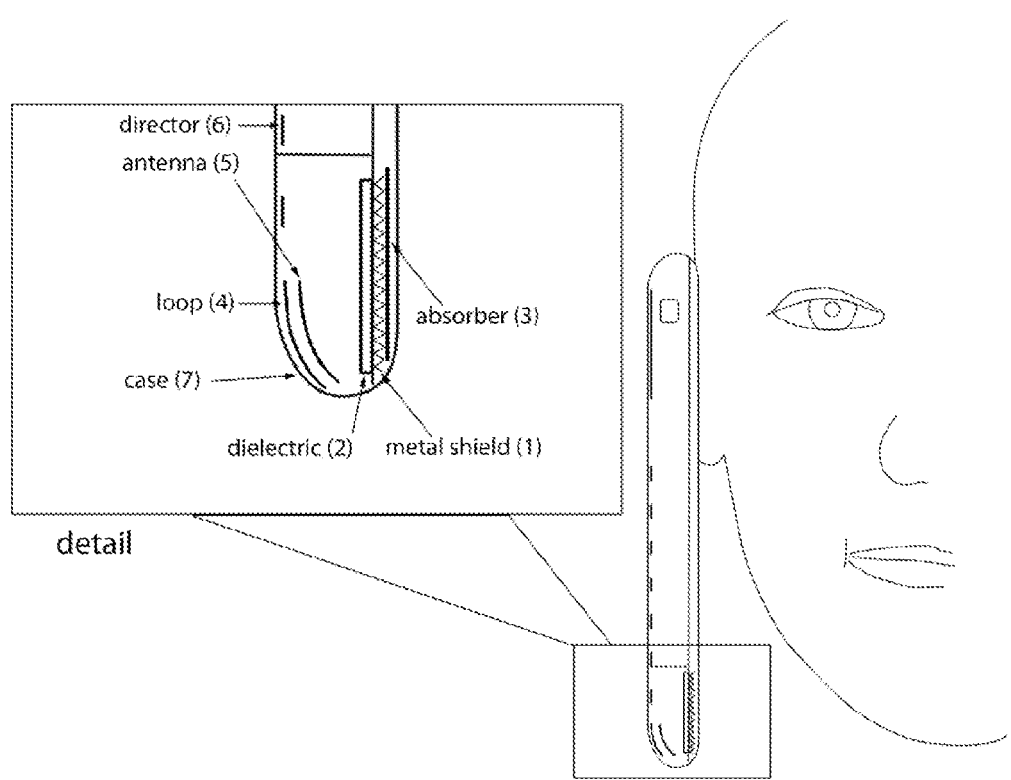
FIG. 10 shows an alternate embodiment of FIG. 9 wherein an RF redirection system is integrated into the internal design of a wireless device.

In another embodiment of the invention shown in FIGS. 9 and 10, a shield comprising a corrugated metallic surface is provided, either incorporated into a protective case (FIG. 9), or integrated directly into the body of the mobile communication device itself (FIG. 10). The metallic shield is located on the user side of the phone directly in front of the internal antenna. Such a shield also may be installed inside the cell phone. Such a corrugated surface gives rise to many image dipoles, thereby providing a wide pattern of scattered radiation. The particular shape and size of corrugations are designed to scatter radiation, which normally would be incident upon the user, in directions away from the user as widely as possible. In scientific terms the scattering angles from the incident wave vector could range from +/−40 to +/−180 degrees.

The corrugations generally should have sizes smaller than wavelengths of microwave frequencies transmitted from the wireless device. They therefore introduce scattering wave vectors that are greater than the incident wave vector in directions perpendicular to the incident wave vector. The purpose of the design of the corrugations is to deflect the radiation away from the user and at the same time avoid creating reflections back on the internal radiating antenna; as a result the impedance seen by the output amplifier of the wireless device, e.g. the cell phone, is not affected and the total radiated power of the phone is not reduced, while SAR is significantly reduced.

In this embodiment, the loop 4 and the directors 6 are positioned relative to the internal antenna 5 such that the loop is close to the antenna and couples the RF power out from the back of the phone and up to the directors 6.

As shown in FIG. 9, in a case 7, a layer of highly conductive corrugated metal shield material 1 is, optionally, combined with a layer of absorptive material 3 of a specific frequency range, placed on the side of the metallic shield opposite to the internal antenna, such that with the phone inserted into the external case the shield is positioned between the user's head and the internal antenna. The absorber 3 prevents any radiation that passed through the shield from reaching the user. Also, a layer of dielectric material 2 may be added between the internal antenna and the shield to reduce the spacing required to achieve an effective distance between the antenna and the shield of ¼ wavelength of the RF radiation.

The redirection of RF radiation away from the user's head also may be achieved by the use of a properly located passive RF coupling redirector 4-6 as shown in FIG. 9, in combination with the corrugated shield of highly conductive metallic material 1. An alternate embodiment as shown in FIG. 10 may have the RF redirector 4-6 and metallic shield 1 integrated within the wireless communication device itself.

A main feature of this invention, both as a passive directional beam antenna alone, or in combination with a passive re-directional shield, incorporated in an external case for a wireless phone, or such combination incorporated internally in a wireless phone device, is that the invention directs/redirects radiation away from the user, out of the phone, reducing SAR (Specific Absorption Rate), without adversely affecting TRP (Total Radiated Power). It does this with a directional antenna, or a combination of a directional antenna and re-directive shield, or with a re-directive shield only, integrated within a case of non-conducting or low-conductive materials (variously of silicone, plastic, cloth, etc.) that allow EM waves to propagate outward toward the cell phone tower without suffering any attenuation.

Figure 11:
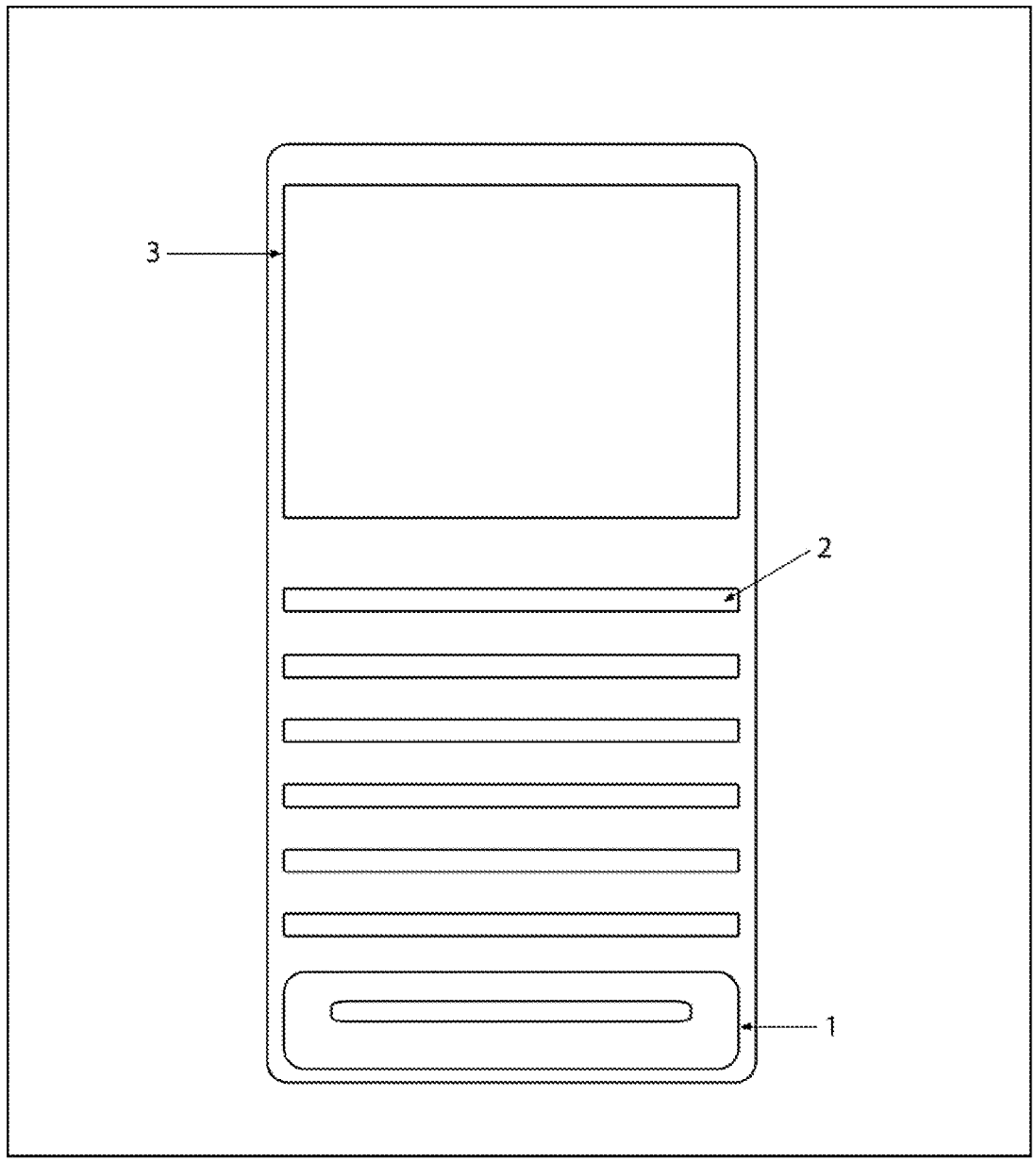
FIG. 11 shows an alternate embodiment of an RF loop design mounted on the back of a mobile telephone device.

A further alternate embodiment of the RF coupling radiation redirector is shown in FIG. 11. Here, a loop 1 consists of a metallic sheet with a narrow slot having a length and width tuned to ¼ of the wavelength of the transmitting RF radiation. For example, a 1900 MHz transmission would correspond to a 40 mm slot length.

What is claimed is:

1. A case for a wireless device, comprising a plurality of RF coupling elements mounted in said case and configured such that RF radiation is coupled from an internal antenna of said wireless device out of said device to a first of said RF coupling elements, and from said first RF coupling element to a RF redirector coupling element that redirects said RF radiation in a direction outward from said wireless device that is opposite to a user side of said wireless device, said plurality of RF coupling elements is configured as a ladder and plate RF redirecting coupler.

2. A case for a wireless device as set forth in claim 1, wherein at least one of said RF coupling elements is configured as a loop.

3. A case for a wireless device as set forth in claim 1, wherein at least one of said RF coupling elements is configured as a horizontal strip.

4. A case for a wireless device as set forth in claim 3, wherein at least one of said RF coupling elements is configured as a vertical strip that functions in combination with a horizontal strip.

5. A case for a wireless device as set forth in claim 4, wherein said vertical strip is mounted in a layer above a horizontal strip.

6. A case for a wireless device as set forth in claim 1, wherein at least one of said RF coupling elements is configured as a U-shaped element.

7. A case for a wireless device as set forth in claim 1, wherein at least one of said RF coupling elements is configured as a plate.

8. A case for a wireless device as set forth in claim 7, wherein said plate is rectangular in shape.

9. A case for a wireless device as set forth in claim 1, wherein said first RF coupling element is configured as a loop and said RF redirector coupling element is configured as a loop.

10. A case for a wireless device as set forth in claim 9, wherein said first RF coupling element loop is positioned over a side and bottom of said wireless device so as to wrap around said internal antenna.

11. A case for a wireless device as set forth in claim 1, further comprising a metallic shield mounted in said case on a side facing a user of said device.

12. A case for a wireless device as set forth in claim 11, further comprising a radiation absorbing material mounted adjacent to said metallic shield between said shield and said user.

13. A case for a wireless device as set forth in claim 11, further comprising a strip of dielectric material mounted between said internal antenna and said metallic shield.

14. A case for a wireless device as set forth in claim 1, wherein said metallic shield is corrugated.

15. A case for a wireless device as set forth in claim 1, wherein a size of corrugations of said metallic shield is smaller than wavelengths of microwave frequencies transmitted from the wireless device.

16. A case for a wireless device as set forth in claim 1, wherein said first RF coupling element comprises a metallic sheet having a slot formed therein of a length and width tuned to $1;4$ of the wavelength of RF transmission from said internal antenna.

17. A wireless device, comprising:
a plurality of RF coupling elements mounted in said wireless device and configured such that RF radiation is coupled from an internal antenna of said wireless device out of said device to a first of said RF coupling elements, and from said first RF coupling element to a RF redirector coupling element that redirects said RF radiation in a direction outward from said wireless device that is opposite to a user side of said wireless device, said plurality of RF coupling elements is configured as a ladder and plate RF redirecting coupler.

18. A wireless device as set forth in claim 17, further comprising a metallic shield mounted in said case on a side facing a user of said device.

19. A wireless device as set forth in claim 18, wherein said metallic shield is corrugated.

20. A wireless device as set forth in claim 19, wherein a size of corrugations of said metallic shield is smaller than wavelengths of microwave frequencies transmitted from the wireless device.

21. A wireless device as set forth in claim 18, further comprising a radiation absorbing material mounted adjacent to said metallic shield between said shield and said user.

22. A wireless device as set forth in claim 18, further comprising a strip of dielectric material mounted between said internal antenna and said metallic shield.

* * * * *